United States Patent [19]
Burrows et al.

[11] 3,750,036
[45] July 31, 1973

[54] AUTOMATIC CONTROL

[75] Inventors: Philip Richard Miles Burrows, Sevenoaks; Ian McGrath Raymond, Gravesend; Michael Peter Alwyn Terry, Rainham, all of England

[73] Assignee: Reed International Limited, London, England

[22] Filed: Oct. 21, 1971

[21] Appl. No.: 191,189

[30] Foreign Application Priority Data
Oct. 21, 1970 Great Britain.................... 50,024/70

[52] U.S. Cl.................. 328/151, 307/235, 307/229, 328/127
[51] Int. Cl........ H03k 5/00, G06g 7/18, G06g 7/12
[58] Field of Search.................... 328/127, 128, 151; 307/229, 230, 238, 235; 318/599, 636; 323/DIG. 1

[56] References Cited
UNITED STATES PATENTS
3,378,758  4/1908  Goodenow..................... 323/DIG. 1
3,229,212  1/1966  Rogers............................... 328/151

Primary Examiner—John W. Huckert
Assistant Examiner—B. P. Davis
Attorney—Leo A. Rosetta et al.

[57] ABSTRACT

A signal representative of the magnitude of a variable is generated and is adjusted in dependence upon a control signal by sampling the signal representative of the variable at predetermined intervals, varying the sampling period in dependence upon changes in the control signal, and integrating the sampled signal to derive a signal which varies as a function of both the amplitude and width of the sample pulses.

8 Claims, 6 Drawing Figures

AUTOMATIC CONTROL

This invention concerns improvements in automatic control and is particularly concerned with the automatic control of the magnitude of a signal representative of one variable in dependence upon the magnitude of a signal representative of a variable which, in the case of a gain control arrangement for example, may be the same variable or alternatively may be a different, control variable. The need for such a control mode is widely recognised in various fields of industrial technology.

According to this invention there is provided a method of controlling the magnitude of a signal representative of a variable comprising, sampling the signal at predetermined intervals, varying the sampling period in dependence upon the magnitude of a control signal, and integrating the sampled signal to derive a signal representative of the magnitude of the first-mentioned signal adjusted in dependence upon the magnitude of the control signal.

The present invention also provides apparatus for performing the above-defined method which includes means for sampling the first-mentioned signal at predetermined intervals, means for varying the sampling period of said sampling means in dependence upon the magnitude of a control variable, and means for integrating the output of the sampling means to derive a signal representative of the magnitude of the first-mentioned signal adjusted in dependence upon the magnitude of the control signal.

The sampling means and the means for varying the sampling period may comprise respectively a switch for gating the said first-mentioned signal and a pulse generation circuit controlled in dependence upon the magnitude of the control signal to control the period during which the switch is gated to pass the sampled signal. Thus, in an electronic arrangement according to this invention, the sampling means includes an electronic switching circuit and is arranged to be gated by a multivibrator circuit, the mark : space ratio of the multivibrator circuit being arranged to be varied in dependence upon the magnitude of the control variable and the switching circuit being arranged to be gated open to pass the signal to be sampled either during the mark or during the space of the multivibrator output signal.

The present invention is particularly useful in circumstances where in order to monitor a variable it is necessary to employ a monitoring system which is itself variable in dependence upon a second variable, and it is desired to provide an indication of the value of the monitored variable relative to a notional constant value of the other variable. An automatic control system which involves such a circumstance is disclosed in the specification of German Patent publication No. 2,152,552: in this system, which concerns the automatic control of certain functions of a papermaking machine of the Fourdrinier type, the magnitude of a signal representative of the overall light flux reflected from a predetermined area of the machine wire is dependent upon the illumination of the area, and, although the output of the illuminating light source may be virtually constant, the environment of a papermaking machine is so hostile to measurement of ligt intensities, by virtue of its high humidity etc. which causes contamination of the optics of monitoring apparatus so resulting in variation of signal levels, that it is necessary to monitor both the light reflected from the machine wire and the light from the illuminating light source and then adjust the signal representative of the former in dependence of the signal representative of the latter to obtain a signal representative of the light flux reflected from the machine wire relative to a notional constant level of illumination of the wire.

In the preferred form of control apparatus described in German Patent publication No. 2,152,552 a single optical system is provided for viewing both the light reflected from the machine wire and the illuminating light source, and a single photoelectric means arranged to provide output signals alternately representative of the intensity of light reflected from the machine wire and representative of the intensity of the illuminating light source is employed, the output of the photoelectric means thus being in the form of a series of pulses alternate pulses of which correspond to the magnitude of the reflected light flux and intermediate pulses of which correspond to the intensity of the illuminating light source. The present invention provides an electronic system for use with the control apparatus of German Patent publication No. 2,152,552 in which both sets of pulses from the photoelectric means (i.e, one set corresponding to reflected light and the other set corresponding to illuminating light source intensity) are sampled by a sampling circuit and fed to an integrating amplifier. The output of the amplifier is switched at the pulse repetition frequency of the photoelectric means output to separate the two component parts of the amplifier output signal, i.e. the part relating to reflected light intensity and the part relating to illuminating light source intensity, respectively into an output channel and into a control channel for adjusting the sampling pulse width. In the control channel, the part of the amplifier output signal representative of the intensity of the illuminating light source is compared with a fixed reference to derive an error signal which is then used to control the mark: space ratio of an astable multivibrator circuit, the output signal of which is arranged to control a switching circuit for effecting the sampling of the input signal from the photoelectric means, the switching circuit being arranged to pass the input signal during either only the mark or only the space of the multivibrator output.

In order that this invention might be understood more clearly an embodiment thereof designed for use in the papermaking machine control system described in German Patent publication No. 2,152,552 will now be described with reference to the accompanying drawings wherein.

Figure 1:
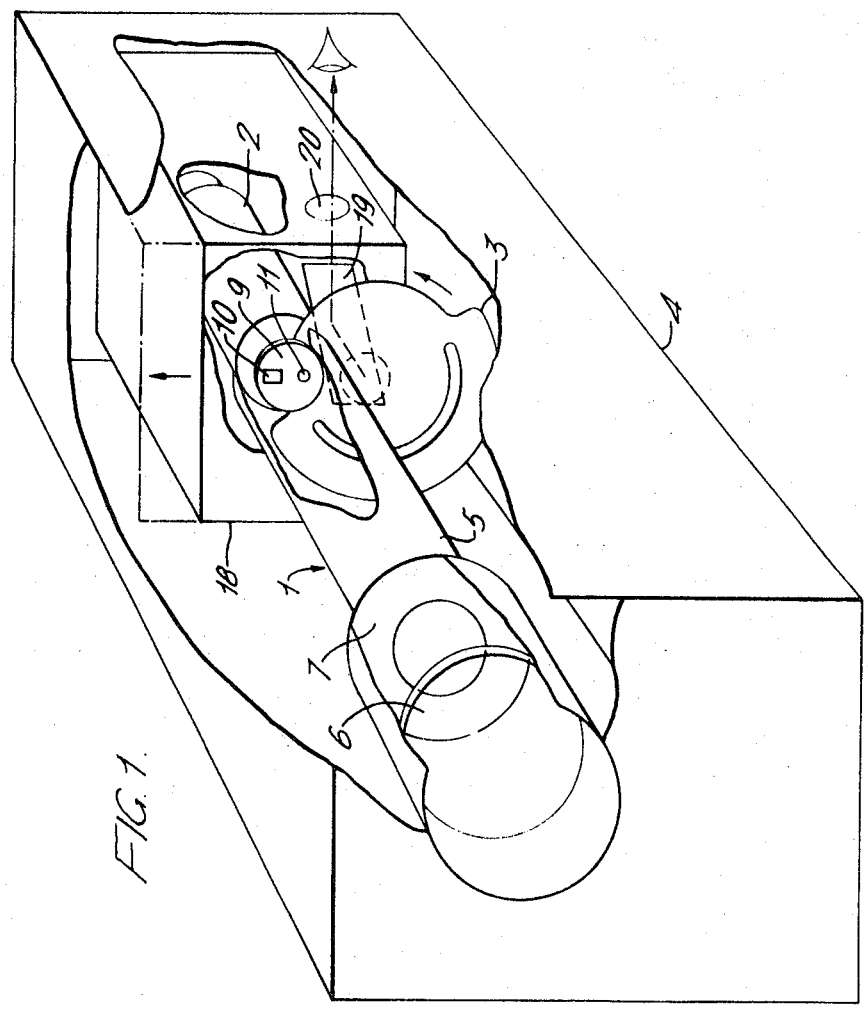
FIG. 1 is a simplified perspective view of an optical unit forming part of the control system
Figure 2:
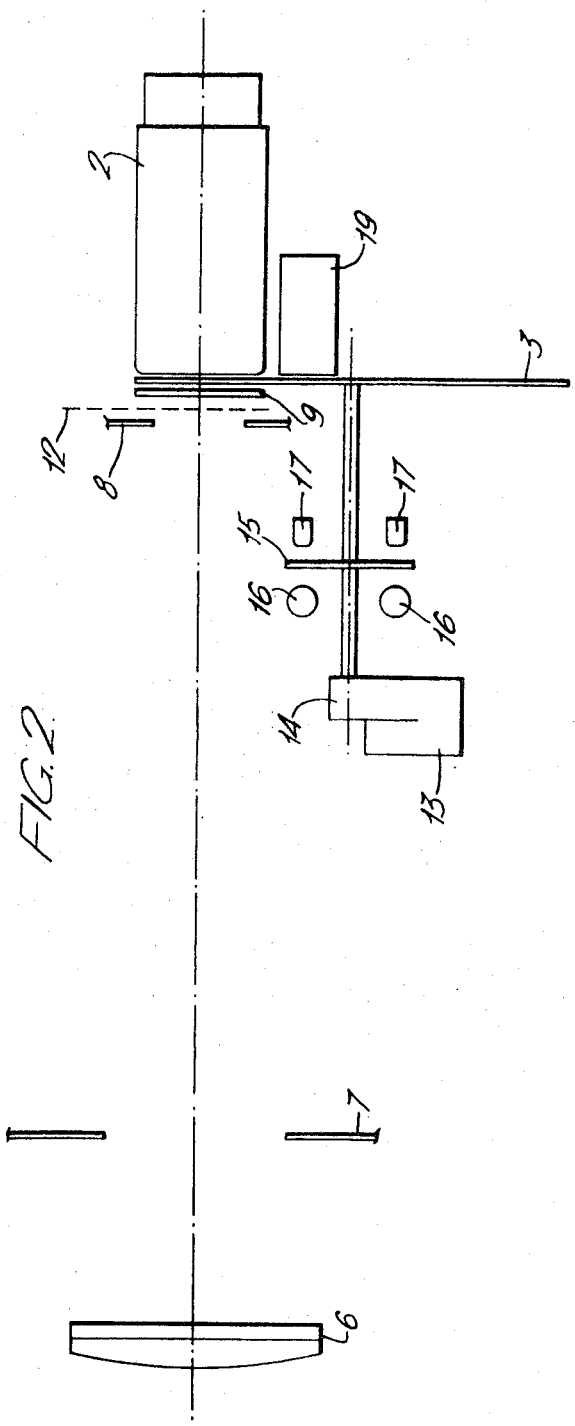
FIG. 2 is a side elevational view of the optical unit of FIG. 1 showing the dispositions of the components.

Referring first to FIGS. 1 and 2 the optical unit shown therein consists basically of an optical system 1 adapted for viewing both the so-called dry line area of a papermaking machine wire and the light source illuminating such area, photoelectric means 2 in the form of a photomultiplier tube arranged to receive images of the viewed dry line area and of the illuminating light source, and a chopper disc 3 designed so as when rotated to permit the photomultiplier tube 2 to view alternately the images formed by the optical system 1 of the dry line area and of the illuminating light source, the whole unit being enclosed within a protective housing 4.

The optical system 1 is constituted by a telescope tube 5 having a long focal length (178 mm) lens 6 situated about three inches back from the front of the telescope tube in order to "hood" the lens 6 to limit the entrance of extraneous light into the optical system. Angled grooves (not shown) are also provided on the inner surface of the telescope tube 5 to reduce further the entrance of extraneous light into the optical system. The field of view of the optical system 1 is limited by providing two field stops 7 and 8 within the telescope tube 5 and by providing an optical mask 9 in the image plane of the system.

The optical mask 9 is a thin metal disc having cut out areas 10 and 11 for admitting the images formed by the optical system of the complete dry line area of the machine wire and of the illuminating light source respectively. Typical images of the dry line area and of the illuminating light source are shown in FIG. 1. The mask 9 prevents light from portions of the field of view of the optical system, other than those containing the dry line area and the illuminating light source, from entering the photomultiplier 2. A neutral filter 12 may be provided in front of the mask 9 so as to adjust the light flux of the two images to the same order of magnitude, a cut-out being provided in the filter to pass the image of the dry line area.

Between the mask 9 and the photomultiplier 2 is fitted a rotatable chopper disc 3 so constructed that for approximately 175° of a revolution of the disc the cutout area 10 of the mask 9 is uncovered and the cut-out area 11 obscured so that only the image of the dry line area formed by the optical system can pass to the photomultiplier 2, and for the diametrically opposite 175° the converse applies with the cut-out area 10 obscured and the cut-out area 11 uncovered so as to pass only the image formed by the optical system of the illuminating light source to the photomultiplier 2. The shape of the chopper disc 3 necessary to achieve its function as described above, can be seen from FIG. 1. A miniature electric motor 13 drives the chopper disc 3 through a gearbox 14 at a speed such as to expose each image to the photomultiplier for a period of about half a second: a slow chopping rate relative to $50H_z$ mains frequency is preferred for reasons of convenient signal analysis, since the $50H_z$ mains supply normally used to power the illuminating light source will result in there being a considerable component of the output signal of the photomultiplier at $100H_z$ which could complicate analysis of the photomultiplier output signal if the chopping rate were higher.

Mounted on the same drive shaft as the chopper disc 3 for rotation therewith is a subsidiary control chopper disc 15 which, in conjunction with light sources 16 and photocells 17, produces control signals necessary for identifying which of the two possible images, i.e. dry line image or illuminating light source image, is being viewed by the photomultiplier at any given instant. The subsidiary chopper disc 15 has a gate angle of approximately 170° as compared with the 175° gate angle of the main chopper disc 3, the overlap being provided to permit the main path signal from the photomultiplier 2 to settle before a control signal is generated by the subsidiary chopper.

The photomultiplier tube 2 is of the end-viewing type and is mounted close behind the chopper disc 3 with its viewing window normally aligned with the mask 9. To enable the optical unit to be aligned to ensure that the dry line and light source images coincide with the windows 10 and 11 in the mask 9, the photomultiplier 2 is securely clamped within an enclosed box 18 which is movable transversely to the optical axis of the optical system 1 to move the photomultiplier 2 out of position and move an inclined mirror 19 into the optical axis. The inclined mirror 19 is screened from the photomultiplier 2, and a circular cut-out 20 in the side of the box 18 and another normally closed cut-out in the side of the housing 4 permit alignment viewing.

Figure 3:
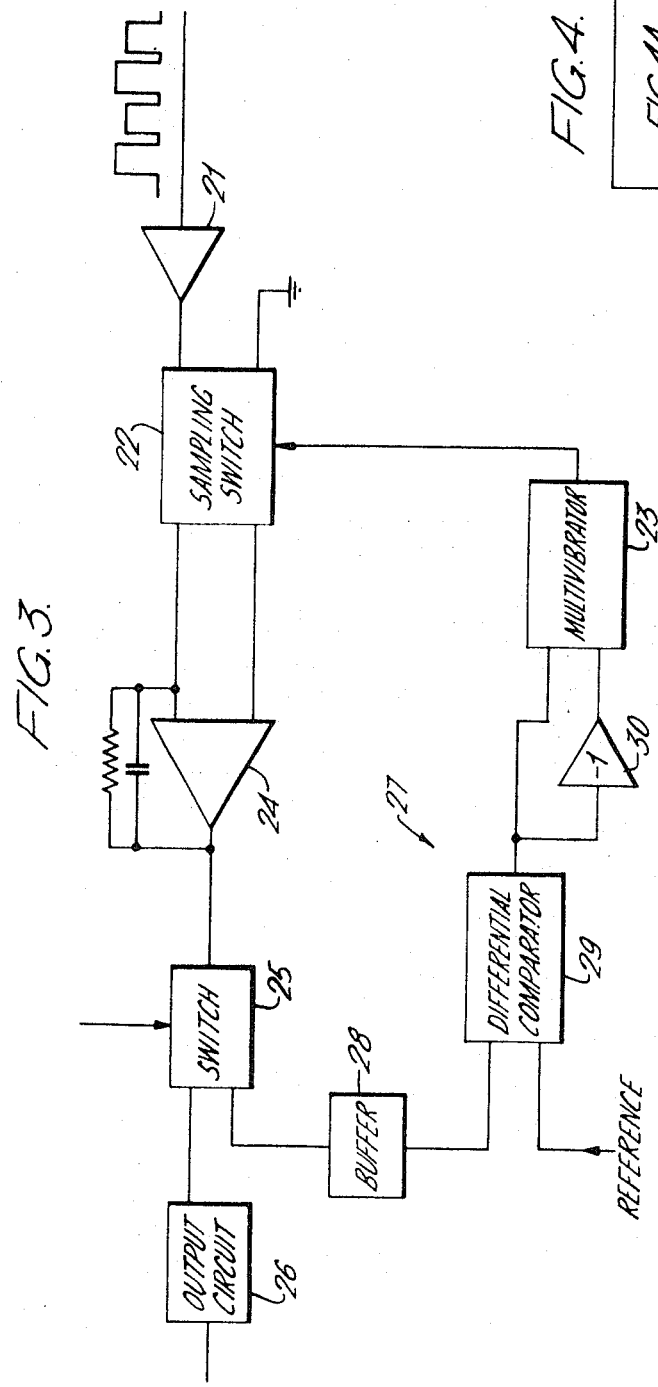
FIG. 3 is a diagrammatic representation of an electronic arrangement according to this invention designed to accept and process the output signals of the optical unit shown in FIGS. 1 and 2.

FIG. 3 shows a schematic circuit diagram of electronic circuitry according to this invention for use with the optical unit described above. This circuitry is designed to accept the photomultiplier output signal and the signals from the subsidiary control chopper in the optical unit and produce a dry line position deviation output reading. The circuit includes closed-loop gain-stabilized circuits which use the effective brightness of the lamp illuminating the dry line positions (i.e. the brightness of the lamp as "seen" by the photomultiplier) as a continuous reference signal for calibration purposes.

The output signal from the photomultiplier 2 is first fed to a non-inverting high input impedance amplifier 21 having a small value of voltage gain. This amplifier 21 acts simply as a pre-amplifier and impedance buffer, and may be included in the housing of the optical unit. The output of the pre-amplifier 21 resembles a high mark:space ratio square wave, alternate marks of which have an amplitude which varies with dry line movement and intermediate marks of which have an amplitude representative of the brightness of the illuminating light source. As described previously with reference to FIGS. 1 and 2, the main chopper disc 3 gates each of the two light images to the photomultiplier 2 for 175° of each revolution so that for 10° of each revolution (i.e. two periods of 5° each) the photomultiplier 2 is completely blanked out; this accounts for the signal spaces in the output of the pre-amplifier 21. As mentioned previously, the chopper disc 3 is driven at such a rate that the marks in the preamplifier output have a duration of about one half second.

The output of preamplifier 21 is fed to a sampling circuit 22 in the form of a sampling switch controlled by the output of a variable mark:space ratio multivibrator circuit 23 so as to pass the output of the preamplifier 21 during the marks of the multivibrator output but not during the spaces. The multivibrator 23 is arranged to have a pulse repetition frequency of the order of $10KH_z$, so that the pulses fed to the sampling circuit 22 from the preamplifier 21 which have a pulse repetition frequency of approximately $1H_z$ are each chopped by the sampling circuit 22 into variable width pulses at a pulse repetition frequency of $10KH_z$. As explained below the mark:space ratio of the multivibrator 23 output is varied in dependence upon the brightness of the illuminating light source.

The output of the sampling circuit 22 is fed to the input of a low pass integrating amplifier 24 which provides an output signal the level of which depends upon both the amplitude and width of the pulses applied to the integrating amplifier 24 from the sampling circuit 22.

The integrating amplifier 24 supplies its output signal to a switching circuit 25 which is controlled by control pulses from the subsidiary control chopper 15, 16, 17 of the optical unit shown in FIG. 1 to switch those parts of the signal applied thereto which correspond to viewing of the dry line position image by the photomultiplier 2 to an output circuit 26 where they are used to provide an indication of dry line position, and to switch those parts of the signal from the integrating amplifier 24 which correspond to viewing of the illuminating light source by the photomultiplier 2 into a closed loop control circuit 27.

The output circuit 26, as shown fully in FIG. 3, includes a long time constant circuit which receives and stores the signal supplied thereto by the switching circuit 25 for a period such that the output circuit does not respond to the absence of any input thereto during the "lamp-viewed" part of the output of integrating amplifier 24. The long time constant circuit provides its output to a unity gain buffer amplifier with provides an output to a meter for indicating dry line position.

Figure 4:
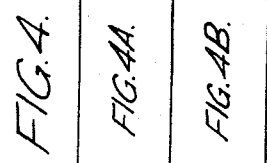
FIG. 4 shows the interrelationship between FIGS. 4A and 4B which together show a detailed circuit diagram of the arrangement shown in FIG. 3.
Figure 4A:
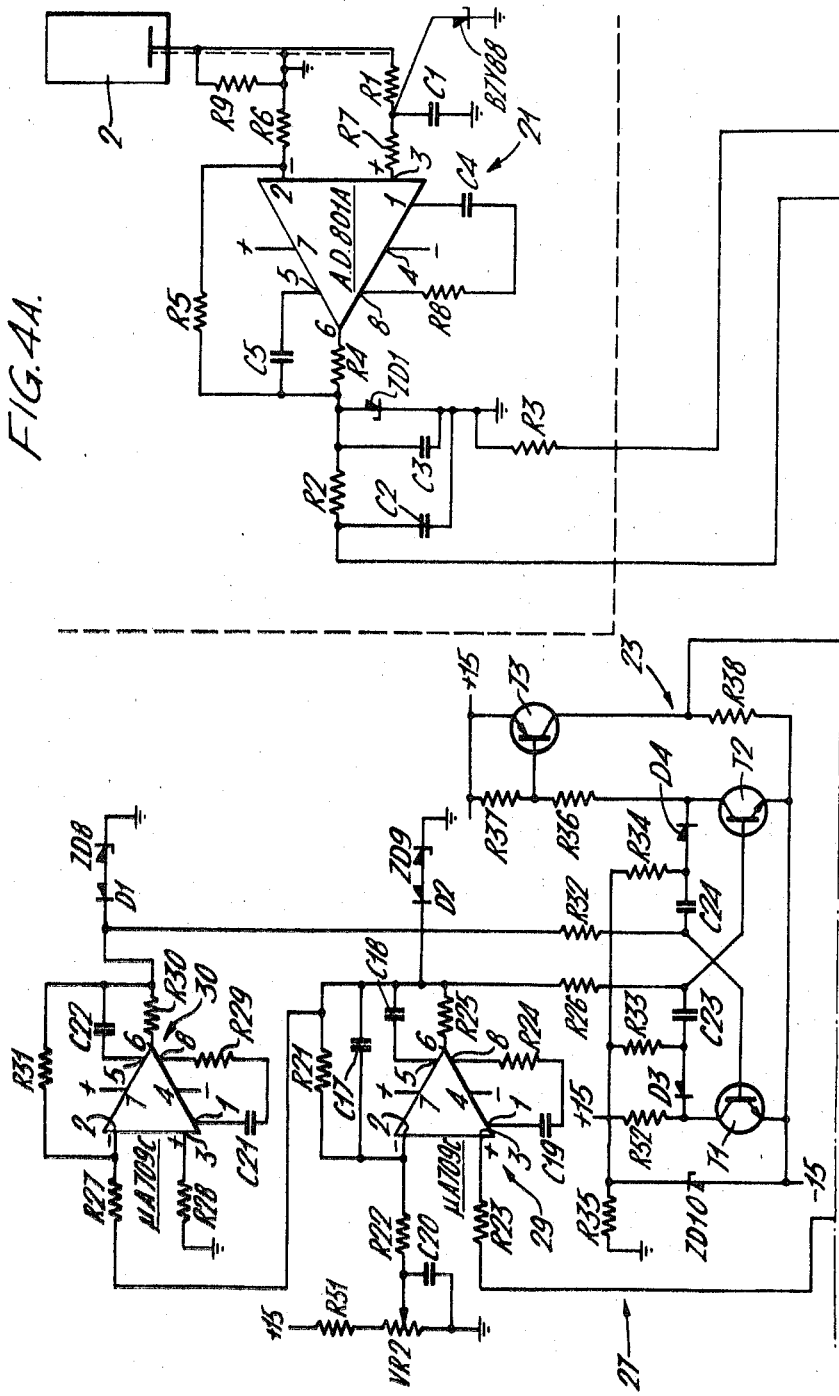
Figure 4B:
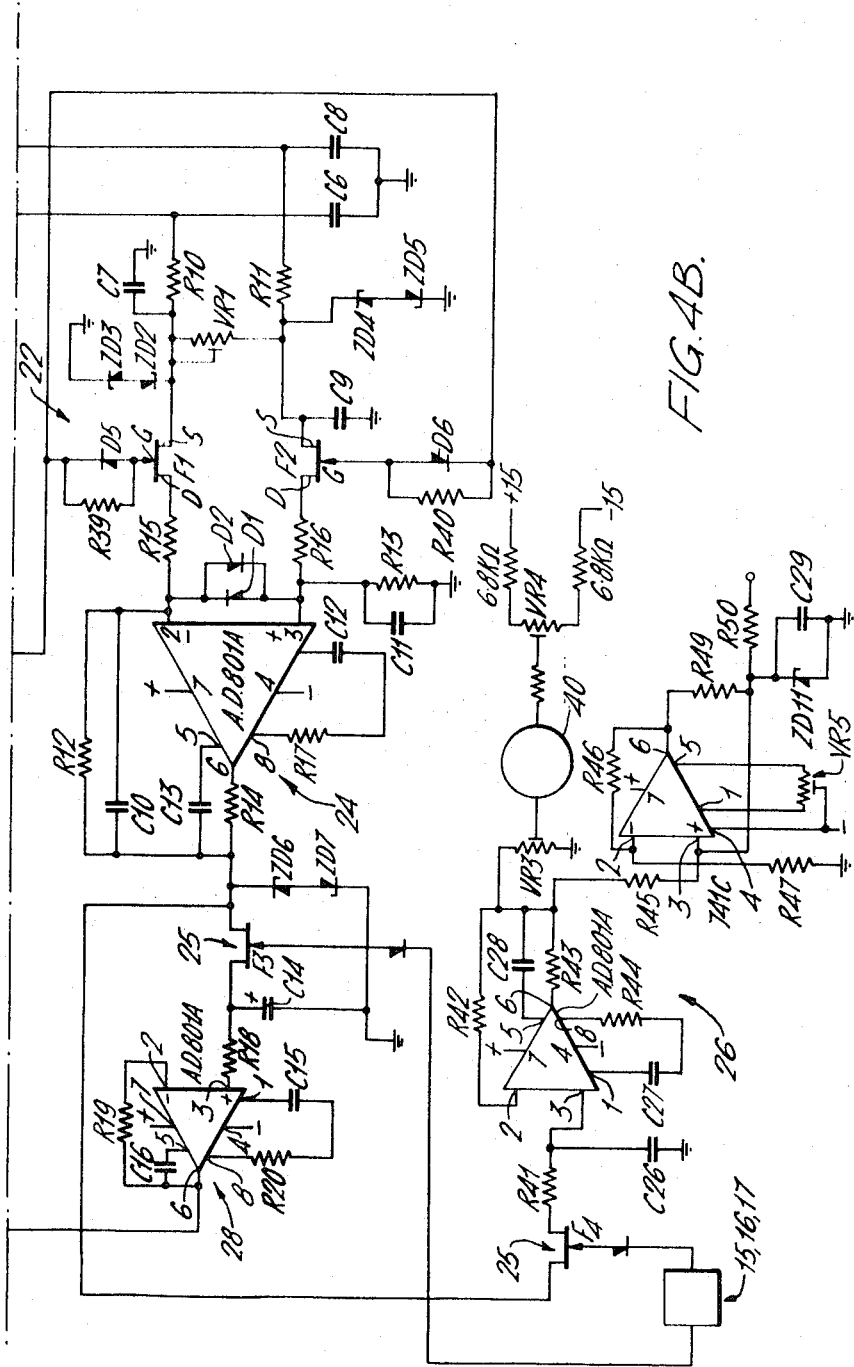

The closed loop control circuit 27 receives the "lamp-viewed" part of the output of integrating amplifier 24 and applies it to a long time constant circuit coupled to a unity gain buffer amplifier 28. The long time constant circuit and buffer amplifier 28 serve to hold the signal level constant during the "dry line viewed" periods when the switching circuit 25 provides no signal to the control circuit 27. The "lamp viewed" signal from hold amplifier 28 is supplied as one input to a differential comparator circuit 29 which receives as a second input an adjustable reference voltage corresponding to a notional constant level of illumination of the machine wire, and provides an amplified signal proportional to the difference between its two inputs. An inverter 30, having unity gain, is coupled to the output of the comparator 29 so that two paraphase outputs are available from the comparator. These two paraphase outputs from the comparator 29 and inverter 30 are coupled to the multivibrator circuit 23 as shown in FIG. 4 to control the mark:space ratio thereof in such a manner as to cause the input to the comparator 29 from hold amplifier 28 to approach the reference voltage level. The operation of the control circuit 27 thus is such that the "lamp-viewed" signal from hold amplifier 28 is compared with a preset reference level by comparator 29 and any resulting difference signal is employed to adjust the mark:space ratio of the multivibrator 23 thereby to adjust the sampling pulse width at switch 22 to result in the signal applied to the comparator 29 from the hold amplifier 28 approaching the preset reference level. During the "dry line viewed" periods of the signal from the photomultiplier 2, the control circuit gain is maintained at that set during the previous "lamp viewed" signal period by virtue of suitable selection of circuit time constants.

Referring now to FIG. 4 there is shown therein a detailed representation of the circuit of FIG. 3. The principal integers of the circuit of FIG. 3 are identified in FIG. 4 by the same reference numerals.

The diagrammatically-shown photomultiplier 2, the E.H.T. power supply to which does not need to be voltage stablized (since the following control circuit provides compensation for photomultiplier gain changes just as it provides compensation for change in the illuminating light source intensity) and may be conventional, supplies its output to preamplifier 21 in the form of an operational amplifier type A.D.801A manufactured by Analogue Devices Ltd. and connected in a non-inverting high input impedance low voltage gain configuration. A degree of low pass filtering is effected on the photomultiplier output signal before it enters the preamplifier 21 by means of capacitor $C_1$ and resistor $R_1$. An RC filter, resistance $R_2$ and capacitor $C_2$, and zener diode clamp $ZD_1$ (type BZY94 C11) protects the amplifier output from damaging noise spikes, which may be introduced into connection wires between the optical unit and the amplifier unit. An impedance $R_3$ is introduced into the signal earth output of the preamplifier 21 to match the impedance of the RC filter ($R_2,C_2$) in an attempt to balance the signal line impedance and so reduce the pick-up of common mode noise. Resistor $R_4$ is provided in the output circuit of the amplifier for the purpose of protecting the amplifier output against short circuit to earth or to either amplifier supply rail, this resistor being in the amplifier feedback path does not significantly affect the amplifier output impedance.

The values of the components of the preamplifier 21 are given below;

Resistors:

| | | | |
|---|---|---|---|
| $R_1$ | 10KΩ | $R_6$ | 7.5KΩ |
| $R_2$ | 470Ω | $R_7$ | 7.5KΩ |
| $R_3$ | 470Ω | $R_8$ | 1.5KΩ |
| $R_4$ | 220Ω | $R_9$ | 22KΩ |
| $R_5$ | 22KΩ | | |

Capacitors:

| | | | |
|---|---|---|---|
| $C_1$ | 0.68μF | $C_4$ | 4.7nF |
| $C_2$ | 0.005μF | $C_5$ | 220pF |
| $C_3$ | 0.005μF | | |

The output of the preamplifier 21 is fed via a switching circuit (or sampling circuit) 22 to the input of the integrating differential amplifier 24 constituted by an operational amplifier type AD801A manufactured by Analogue Devices Ltd. The triggered switching circuit 22 includes two field effect transistors F1 and F2 (type T1S 73) arranged to receive control pulses simultaneously from multivibrator circuit 23. A CR low pass filter stage is provided at the input of integrating amplifier 24, in the form of a balanced—$\pi$ network comprising the components $C_6$ $R_{10}$ $C_7$ and $C_8$ $R_{11}$ and $C_9$. Approximate range adjustment is provided by means of shunt resistance VR 1. Zener diode clamps $ZD_2$, $ZD_3$ and $ZD_4$, $ZD_5$ (all type BZY 88 C5.V6) limit the common mode signal range to about ± 6 volts, a value slightly lower than the commond mode range of amplifier 24. The filter and diode clamps remove unwanted signal noise and high amplitude spikes and other input interference that could cause damage to the input stages of integrating amplifier 24 or to the two field effect transistors $F_1$ and $F_2$. Series mode protection of the input circuit of integrating amplifier 24 is provided by the shunt diodes D1 and D2 (type 1S44), and low pass filtering is further provided by capacitors $C_{10}$ and $C_{11}$ the values of which are chosen in conjunction with the values of resistors $R_{12}$ and $R_{13}$ to effectively average out the series chopping which occurs at a rate of about 10KH$_z$ and to reduce 100H$_z$ variations originating from 50H$_z$ mains supply without distorting to any appreciable extent the envelope of the input signal which, as mentioned previously, has a frequency of 1H$_z$. Zener diodes $ZD_6$ and $ZD_7$ (both type BZY88 C5.V1) are provided to limit the linear output voltage range of amplifier 24 to from 0 to about 5.8 volts, and resistor $R_{14}$ protects the amplifier output. Stage gain, after the switches $F_1$ and $F_2$, is defined by the ratios $R_{12}/R_{15}$ and $R_{13}/R_{16}$ which must be exactly equal for balanced differential operation.

The values of the components of the switching circuit 22 and integrating amplifier 24 are listed below;

Resistors:

| | | | |
|---|---|---|---|
| $R_{10}$ | 1KΩ | $R_{14}$ | 330Ω |
| $R_{11}$ | 1KΩ | $R_{15}$ | 10KΩ |
| $R_{12}$ | 22KΩ | $R_{16}$ | 10KΩ |
| $R_{13}$ | 22KΩ | $R_{17}$ | 1.5KΩ |

Capacitors:

| | | | |
|---|---|---|---|
| $C_6$ | 0.005μF | $C_{10}$ | 0.10μF |
| $C_7$ | 0.068μF | $C_{11}$ | 0.10μF |
| $C_8$ | 0.005μF | $C_{12}$ | 4700pF |
| $C_9$ | 0.068μF | $C_{13}$ | 220pF |

The output of integrating amplifier 24 is coupled to two field effect transistors $F_3$ and $F_4$ (both type T1S73) connected to receive gating inputs from the schematically-represented subsidiary or control chopper 15,16,17 of the optical unit, the field effect transistors $F_3$ and $F_4$ thus constituting the switch 25 of the FIG. 3 circuit. The field effect transistors $F_3$ and $F_4$ are gated on during such periods as to pass the "lamp viewed" part of the output of amplifier 24 to the closed loop control circuit 27 and to pass the "dry line viewed" part of amplifier 24 output to output circuit 26 respectively.

The "lamp-viewed" portion of the output of integrating amplifier 24 is switched by field effect transistor $F_3$ on to storage capacitor $C_{14}$ in the input circuit of unity gain buffer amplifier 28. Capacitor $C_{14}$ to a high quality tantalum electrolytic capacitor chosen in conjunction with the input impedance of buffer amplifier 28 and the low leakage of field effect transistor $F_3$ when "off" to provide negligible fall off of the stored signal during "dry line viewed" periods.

The values of the components of the buffer amplifier 28 are as follows:

Resistors:

| | |
|---|---|
| $R_{18}$ | 10KΩ |
| $R_{19}$ | 33KΩ |
| $R_{20}$ | 1.5KΩ |

Capacitors:

| | |
|---|---|
| $C_{14}$ | 100μF |
| $C_{15}$ | 4.7nF |
| $C_{16}$ | 220pF |

The output of buffer amplifier 28 is applied to a differential comparator 29 constituted by an operational amplifier type μA709c manufactured by Fairchild Semiconductors Ltd. in the circuit configuration shown. The differential comparator 29 also receives a reference level input from adjustable resistor VR2. The comparator 29 has a high gain, as set by resistors $R_{21}$ and $R_{22}$, the gain being $R_{21}/R_{22}$, and exhibits a time lag, the lag time constant being determined by $R_{21}$ and capacitor $C_{17}$.

The components of the differential comparator 29 are valued as follows:

Resistors:

| | |
|---|---|
| $R_{21}$ | 2.7MΩ |
| $R_{22}$ | 15KΩ |
| $R_{23}$ | 15KΩ |
| $R_{24}$ | 1.5KΩ |
| $R_{25}$ | 220Ω |
| $R_{26}$ | 68KΩ |

Capacitors:

| | |
|---|---|
| $C_{17}$ | 330pF |
| $C_{18}$ | 220pF |
| $C_{19}$ | 4.7nF |
| $C_{20}$ | 200μF |

Reference numeral 30 denotes an inverter, having unity gain, constructed around an operational amplifier. The inverter 30 provides an output which is the inversion of the output of the comparator 29. The components of the inverter are valued as follows:

Resistors:

| | |
|---|---|
| $R_{27}$ | 10KΩ |
| $R_{28}$ | 4.7KΩ |
| $R_{29}$ | 1.5KΩ |
| $R_{30}$ | 220Ω |
| $R_{31}$ | 10KΩ |
| $R_{32}$ | 68KΩ |

Capacitors:

| | |
|---|---|
| $C_{21}$ | 4.7nF |
| $C_{22}$ | 220pF |

The two paraphase outputs of differential comparator 29 and inverter 30 are applied, in the manner shown in the Figure, to control the mark:space ratio of the astable multivibrator circuit 23 based upon transistors $T_1$ and $T_2$ (both type BC 182). The output frequency of the multivibrator 23 remains substantially constant, but the mark:space ratio of its output varies considerably with the antiphase control voltages applied thereto from comparator 29 and inverter 30. The maximum negative output voltage excursions of inverter 30 and comparator 29 are clamped at about 12 volts by zener diode ZD8 (type BZY 94 $C_{11}$) and diode $D_1$ (type OA 200) and by zener diode ZD9 (also type BZY94 $C_{11}$) and diode $D_2$ (also type OA 200), but even so the multivibrator has an extreme output mark:space ratio range of about 15:1 to 1:15. Field effect transistors $F_1$ and $F_2$ are driven together from the single ended voltage translator transistor $T_3$ (type BC 212) which in turn is driven from one of the multivibrator transistors $T_2$. Drive voltage swing appearing on the collector of transistor $T_3$ is ± 15 volts which is sufficient to ensure that field effect transistors $F_1$ and $F_2$ operate as switches, i.e. are switched hard "on" or completely "off."

The values of components in and associated with the multivibrator circuit 23 are as follows;

Resistors:

| | | | |
|---|---|---|---|
| $R_{33}$ | 2.2KΩ | $R_{37}$ | 1KΩ |
| $R_{34}$ | 2.2KΩ | $R_{38}$ | 6.8KΩ |
| $R_{35}$ | 2.2KΩ | $R_{39}$ | 100KΩ |
| $R_{36}$ | 10KΩ | $R_{40}$ | 100KΩ |
| | | $R_{52}$ | 10KΩ |

Capacitors:

| | |
|---|---|
| $C_{23}$ | 4.7nF |
| $C_{24}$ | 4.7nF |

Diodes:

| |
|---|
| $D_3$ type 1S44 |
| $D_4$ type 1S44 |
| $D_5$ type 1S44 |
| $D_6$ type 1S44 |
| ZD 10 type BZY88.C5.V6 |

The "dry line viewed" portion of the signal output of integrating amplifier 24, gated by field effect transistor $F_4$ under the control of the subsidiary or control chopper 15,16,17, is fed through a long time constant circuit consisting of resistors $R_{41}$ and capacitor $C_{26}$ to a unity gain buffer amplifier similar in form and function to the buffer amplifier 28 in the "lamp viewed" channel. A long time constant circuit is required to smooth out signal transients due to high speed flickering and fingering of the dry line, and also serves a purpose concerned with a facility described fully hereafter for detecting and minimising the effects of the lamp or dry line field of view of the optical unit being obscured for any reason. For normal operation, the output of the buffer amplifier is a signal representative of the variation in total flux from the viewed dry line area of the machine wire referenced to a notional constant illuminating lamp brightness and thus representative of variation in the dry line position. This signal is reduced by variable resistor VR3 and applied to a deviation indicator 40 in the form of a moving coil meter. Meter zero-ing facilities are provided by a combination of three fixed resistors and a variable resistor VR4, the values of which are chosen to match the meter.

The buffer amplifier just described in the output circuit 26 produces a constant voltage output. For automatic control systems, convention decrees that a constant current output be provided and this is achieved by amplifier 31 which converts the voltage output of the buffer amplifier into a current source having a very high output impedance and thus a substantially constant current output. The output of amplifier 31 is short circuit proof, and protection against damaging noise spikes being received from the output line is provided by the inclusion of resistor $R_{50}$ and zener diode $ZD_{11}$. The output current from amplifier 31 is defined as (input voltage)/$R_{45}$ for $R_{46}/R_{47}$ being equal to $R_{49}/R_{45}$, and currents of at least 5mA are available at the output when feeding into an impedance $\leq 1 K\Omega$.

The components of the output circuit 26 have the following values:

Resistors:
| | | | |
|---|---|---|---|
| $R_{41}$ | 1MΩ | $R_{46}$ | 1KΩ |
| $R_{42}$ | 33KΩ | $R_{47}$ | 1KΩ |
| $R_{43}$ | 220Ω | $VR_5$ | 100KΩ |
| $R_{44}$ | 1.5KΩ | $R_{49}$ | 470Ω |
| $R_{45}$ | 620Ω | $R_{50}$ | 56Ω |

Capacitors:     Diodes:
| | | | |
|---|---|---|---|
| $C_{26}$ | 10μF | | $ZD_{11}$ type 1S 4012A |
| $C_{27}$ | 4.7nF | | |
| $C_{28}$ | 220pF | | |
| $C_{29}$ | 5.0nF | | |

As mentioned above, a means may be provided for detecting the condition that the field of view of the optical unit to the illuminating lamp or dry line area of the machine wire is obscured. For this purpose, the signal output of integrating amplifier 24 may be fed to one input of a differential amplifier the other input of which is connected to a reference potential source. A transistor switch may be coupled to the differential amplifier output and arranged to provide an inhibiting signal to field effect transistor $F_4$ when the signal input to the differential amplifier falls below the reference level input. This has the effect of holding field effect transistor $F_4$ in its "off" condition so long as the signal output from integrating amplifier 24 remains below the reference level, so that the input to the buffer amplifier in the output circuit 26 remains substantially constant and equal to the charge stored in capacitor $C_{26}$. In this way anyone or anything causing any appreciable obscuration of either the lamp or the dry line views of the optical unit such that the output of the integrating amplifier falls below a reference value will result in the signal applied to the output circuit 26 being maintained at a respresentative level.

It is considered that the overall operation of the circuit of FIG. 4 will be clear from previous explanation of the schematic diagram of FIG. 3.

Although this invention has been particularly described in relation to an electronic system, it will be appreciated that the invention is capable of wider application, for example in the field of fluidics.

What we claim is:

1. Apparatus for controlling the magnitude of a signal representative of a variable, including, means for sampling a first signal at predetermined intervals, means for varying the sampling period of said sampling means in dependence upon the magnitude of a control variable, and means for integrating the output of the sampling means to derive a signal representative of the magnitude of said first signal adjusted in dependence upon the magnitude of the control signal, said apparatus being adapted to receive an input signal in the form of a series of pulses alternate pulses of which constitute the said first signal and pulses of which between said alternate pulses constitute a signal representative of said control variable, means for applying both said signal pulses and said control pulses to said sampling means and thence to said integrating means, and means for switching the output of the integrating means at the pulse repetition frequency of said series of pulses to separate the parts of the integrating means output respectively pertaining to the first signal and to the control signal into an output channel and into a control channel incorporating the means for varying the sampling period.

2. Apparatus as claimed in claim 1 wherein the sampling means and the means for varying the sampling period respectively comprise a switch for gating the said first signal and a pulse generation circuit responsive to the magnitude of the control signal for controlling the periods during which the switch is gated to pass the sampled signal.

3. Apparatus as claimed in claim 2 wherein the sampling means includes an electronic switching circuit gated by a multivibrator circuit, the mark: space ratio of the multivibrator circuit being variable in dependence upon the magnitude of the control variable and the switching circuit being gated open to pass the signal to be sampled during one of the mark and the space of the multivibrator circuit output signal.

4. Apparatus as claimed in claim 1 wherein said control channel incorporates means for comparing the integrated control signal with a reference signal to derive an error signal, and means responsive to said error signal for adjusting the sampling period of the sampling means.

5. Apparatus as claimed in claim 4 wherein an inverter is coupled to the output of said means for comparing the integrated control signal with a reference signal whereby two paraphase outputs are available from the comparing means and the inverter, the said two paraphase outputs being coupled to a multivibrator circuit for controlling the mark: space ratio thereof, said apparatus including switch means responsive to the output of the multivibrator circuit for sampling the said first-mentioned signal.

6. Apparatus as claimed in claim 1 including means in said output channel and corresponding means in said control channel for maintaining the level of the signal in the respective channel when the other channel is being supplied from the integrating means.

7. Apparatus as claimed in claim 5 including means in said output channel and corresponding means in said control channel for maintaining the level of the signal in the respective channel when the other channel is being supplied from the integrating means.

8. A method of controlling the magnitude of a signal representative of a variable comprising, alternately sampling the first-mentioned signal and a control signal at a predetermined frequency, integrating the sampled signals, separating the integrated signals respectively pertaining to the first-mentioned signal and to the control signal into an output channel and into a control channel, and varying the sampling period in dependence upon the magnitude of the signal in said control channel to derive a signal representative of the magnitude of the first-mentioned signal adjusted in dependence upon the magnitude of the control signal.

* * * * *